United States Patent
Wu et al.

(10) Patent No.: US 11,982,356 B2
(45) Date of Patent: May 14, 2024

(54) SEAL ASSEMBLY WITH LABYRINTH CHANNEL

(71) Applicant: AKTIEBOLAGET SKF, Gothenburg (SE)

(72) Inventors: Zongbin Wu, Shanghai (CN); John Arthur Wilkins, Chicago, IL (US)

(73) Assignee: AKTIEBOLAGET SKF, Gothenburg (SE)

( * ) Notice: Subject to any disclaimer, the term of this patent is extended or adjusted under 35 U.S.C. 154(b) by 72 days.

(21) Appl. No.: 17/679,315

(22) Filed: Feb. 24, 2022

(65) Prior Publication Data
US 2022/0307604 A1     Sep. 29, 2022

(30) Foreign Application Priority Data

Mar. 23, 2021  (CN) .......................... 202110307566.9

(51) Int. Cl.
*F16J 15/44*    (2006.01)
*F16J 15/447*   (2006.01)

(52) U.S. Cl.
CPC .............................. *F16J 15/4472* (2013.01)

(58) Field of Classification Search
CPC .................................................. F16J 15/4472
See application file for complete search history.

(56) References Cited

U.S. PATENT DOCUMENTS

| | | | |
|---|---|---|---|
| 4,252,329 A * | 2/1981 | Messenger ........... | F16J 15/3264 277/565 |
| 7,455,459 B2 * | 11/2008 | Toth ....................... | G01P 3/443 324/174 |
| 8,141,882 B2 | 3/2012 | Wang et al. | |
| 8,439,363 B2 * | 5/2013 | Greca ................... | F16J 15/3456 277/572 |
| 9,845,883 B2 * | 12/2017 | Larson ................. | F16J 15/3252 |
| 2008/0054572 A1 * | 3/2008 | Maskaliunas ........ | F16J 15/3456 277/551 |
| 2013/0127119 A1 * | 5/2013 | Haepp ................ | F16C 33/7889 277/572 |

FOREIGN PATENT DOCUMENTS

JP           2003314698 A  * 11/2003

* cited by examiner

*Primary Examiner* — Vishal A Patel
(74) *Attorney, Agent, or Firm* — J-TEK LAW PLLC; Scott T. Wakeman; Mark A. Ussai

(57) ABSTRACT

A seal assembly is for sealing a rotating device and includes a dynamic seal component frictionally engageable with a device rotor and a static seal component frictionally engageable with a device stator. The two seal components are formed therebetween with a contact seal based on a sealing lip and a non-contact seal based on a labyrinth gap. The labyrinth gap is located upstream of the sealing lip on the path of foreign matter entering the seal assembly. A thrust bumper is formed in the labyrinth gap and defines a gap width by its own height during the assembly process. The rotating device may be a hub unit of a vehicle or any rotating machine with a rotor and a stator as core components. The rotating equipment adopting the present seal assembly can obtain significantly improved sealing performance, and thus is fully adapted to severely polluted or extremely humid working conditions.

12 Claims, 3 Drawing Sheets

SEAL ASSEMBLY WITH LABYRINTH CHANNEL

CROSS-REFERENCE

This application claims priority to Chinese Patent Application No. 202110307566.9 filed on Mar. 23, 2021, the entire contents of which are fully incorporated herein by reference.

BACKGROUND OF THE INVENTION

The present invention relates to a seal assembly, particularly to a seal assembly for a wheel end assembly of a vehicle.

Seals are widely used in rotary machinery. In a truck wheel end assembly 1 shown in FIG. 1, a hub 2 is rotatably supported on an axle/spindle 3 by a pair of bearings 4. A seal 10 seals the annular space between the hub 2 and the axle 3 from the inboard side (left in the figure) of the vehicle to protect the bearings 4 located in the hub 2 from external contaminants and prevent the lubricant of the bearings from leaking out of the hub.

FIG. 2 shows an enlarged cross-section of the seal depicted in FIG. 1. The seal 10 is preferably a seal assembly for a hub unit currently in use by the applicant, consisting of a seal component 20 frictionally engageable with the hub 2 and a seal component 30 frictionally engageable with the axle/spindle 3. In this type of wheel-end application, since the hub is a rotating component relative to the axle, the sealing assembly 20 that is assembled on the hub and thus can rotate synchronously with the hub is defined herein as a "dynamic seal component", while the seal assembly 30 that is assembled on the axle and thus remains stationary with the axle is then defined herein as a "static seal component".

In the prior-art design shown in FIG. 2, the seal components 20 and 30 are generally annular members, and each includes a rigid frame 22 or 32 made of metal stamping part or "case". Since the dynamic seal component 20 is generally located at the radial periphery of the static seal assembly 30, it is also referred to as the "outer seal" in this text, and the frame 22 contained therein is therefore also called the "outer stamping". Correspondingly, the static seal component 30 is referred to as the "inner seal" because it is located on the radially inner side, and the frame contained therein is therefore called the "inner stamping".

As shown in FIG. 2, a seal member 24 attached to the outer stamping or case 22 includes one or more sealing lips 26 formed on a radially inner side and a sealing gasket 28 formed on a radially outer side. The sealing lips 26 preferably include two radial sealing lips 26a, 26b and an axial sealing lip 26c. The gasket 28 at least partially covers the radially outer surface 22A of the outer stamping or case 22 to form a friction fit with the inner surface 2A of the hub 2, while achieving at the same time a static seal between the hub 2 and the outer seal 20. In addition, the seal member 24 preferably further extends to an inboard side and includes a thrust bumper 27 formed evenly distributed about a circumference of the outer case 22, as described in detail later. The inner stamping or case 32 is mounted by means of a gasket 34 disposed on its radially inner surface 32A, which forms a friction fit with the outer surface 3A of the axle 3, while at the same time providing a static seal between the inner seal 30 and the axle 3.

During assembly, the inner and outer seals 30 and 20 are pushed into the annular space between the hub 2 and the axle 3 from the inboard side as a "whole"; i.e., as single unit. Specifically, the outer seal 20 is pushed to a predetermined depth or axial distance by applying an axial thrust force F to the inner seal 30 until an axial free end 20a of the outer seal 20 abuts against a preset shoulder of the hub 2 or the outer bearing ring 4a.

In the above-described assembly process, the thrust bumper 27 plays a dual role. On the one hand, the thrust force F is transferred through the bumper 27 from the inner seal 30 to the outer seal 20, pushing the outer seal 20, along with the inner seal 30, into the hub in the axial direction. On the other hand, after the outer seal 20 reaches the predetermined position (abutted against the shoulder or the outer ring of the bearing), the axial size or length of the thrust bumper 27 establishes the axial spacing distance between the inner and outer seals. This ensures that, for example, the axial sealing lip 26c abuts against a radial inner surface 32B (or "sealing lip contact portion") on the opening side of the inner stamping/case 32 in a predetermined design attitude or orientation.

More importantly, an outer tip 27a of the thrust bumper 27 will be quickly worn away or abraded after the equipment starts running, thereby forming a non-contact sealing gap between the remaining part of the bumper 27 and the surface 36A of the inner stamping 32. In theory, the non-contact sealing gap will not produce friction and wear, which helps to improve the transmission efficiency of the equipment while avoiding friction and heat generation. However, under severely polluted or extremely humid environmental conditions, contaminants, such as mud, may still enter the seal assembly from the open seal gap, pass through the seal of the sealing lip, and eventually reach the bearing. This is a significant cause of premature failure of hub bearings in humid climates or heavily polluted environments, such that it is desirable to have an axle seal with greater protection capability without significantly increasing friction resistance.

SUMMARY OF THE INVENTION

To solve the above-mentioned technical problem, the present invention provides a seal assembly for sealing the annular space between a rotor and a stator of a rotating device. The seal assembly comprises a dynamic seal component frictionally engageable with the rotor and a static seal assembly frictionally engageable with the stator. The two seal components are configured to form a lip-contact seal through the cooperation or interaction between a sealing lip formed on at least one of the seal components and a sealing lip contact portion formed on the other one of the seal components after assembly, and are also configured to form a non-contact labyrinth seal between a dynamic labyrinth portion of the dynamic seal component and a static labyrinth portion of the static seal component. A labyrinth channel formed between the two labyrinth portions is positioned on a path of foreign matter entering the sealing assembly so as to be located upstream of the lip-contact seal. The labyrinth channel is partially formed by a thrust bumper, which defines a gap width of the labyrinth channel as the height/length of the bumper during assembly of the seal assembly, and the thrust bumper is configured to be at least partially worn away or abraded during the subsequent operation of the rotating device.

By adding the labyrinth channel, the above-described present seal assembly integrates the positioning function of the thrust bumper into the forming process of the labyrinth channel to construct a labyrinth channel as narrow as possible, thereby further improving the protection function of the axle seal.

The present invention further includes a rotating device comprising a rotor and a stator and the above-described present sealing assembly for sealing the annular space between the rotor and the stator.

The rotating device of the present invention is not limited to a hub unit of a vehicle, but can also be any other rotating device or machine with a rotor and a stator as core components. Any such rotating device obtains significantly improved sealing performance due to the use of the present seal assembly, so as to be fully suitable or optimal for use in heavily polluted or extremely humid environments.

BRIEF DESCRIPTION OF THE SEVERAL VIEWS OF THE DRAWINGS

The foregoing summary, as well as the detailed description of the preferred embodiments of the present invention, will be better understood when read in conjunction with the appended drawings. For the purpose of illustrating the invention, there is shown in the drawings, which are diagrammatic, embodiments that are presently preferred. It should be understood, however, that the present invention is not limited to the precise arrangements and instrumentalities shown. In the drawings.

DETAILED DESCRIPTION OF THE INVENTION

Figure 1:
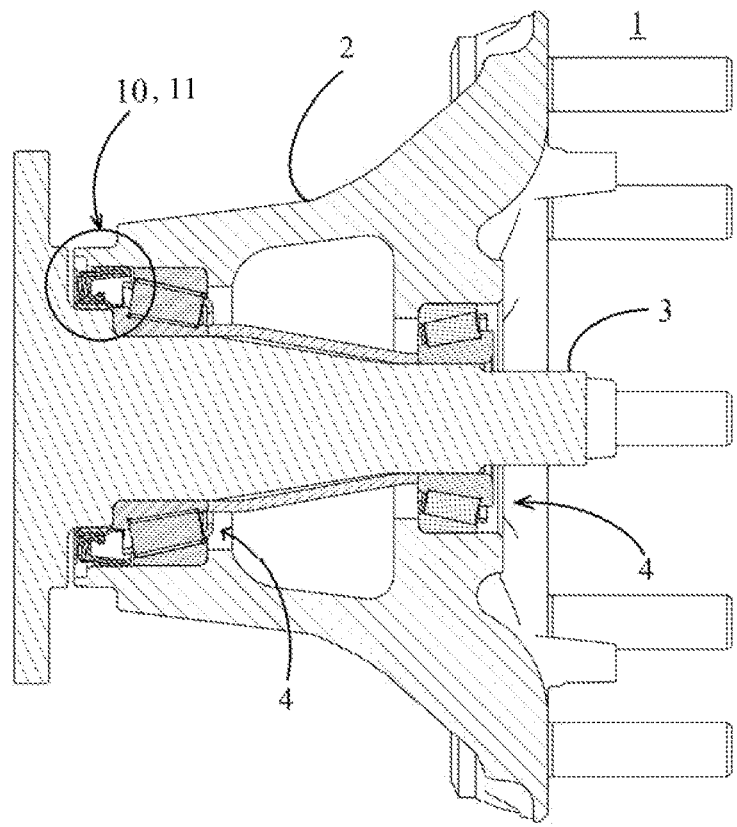
FIG. 1 is a schematic axial cross-sectional view of a truck wheel end assembly.

Certain terminology is used in the following description for convenience only and is not limiting. The words "inner", "inwardly" and "outer", "outwardly" refer to directions toward and away from, respectively, a designated centerline or a geometric center of an element being described, the particular meaning being readily apparent from the context of the description. Further, as used herein, the words "connected" and "coupled" are each intended to include direct connections between two members without any other members interposed therebetween and indirect connections between members in which one or more other members are interposed therebetween. The terminology includes the words specifically mentioned above, derivatives thereof, and words of similar import. In addition, the same reference numerals are used throughout the drawings to denote the same or similar components.

Figure 3:
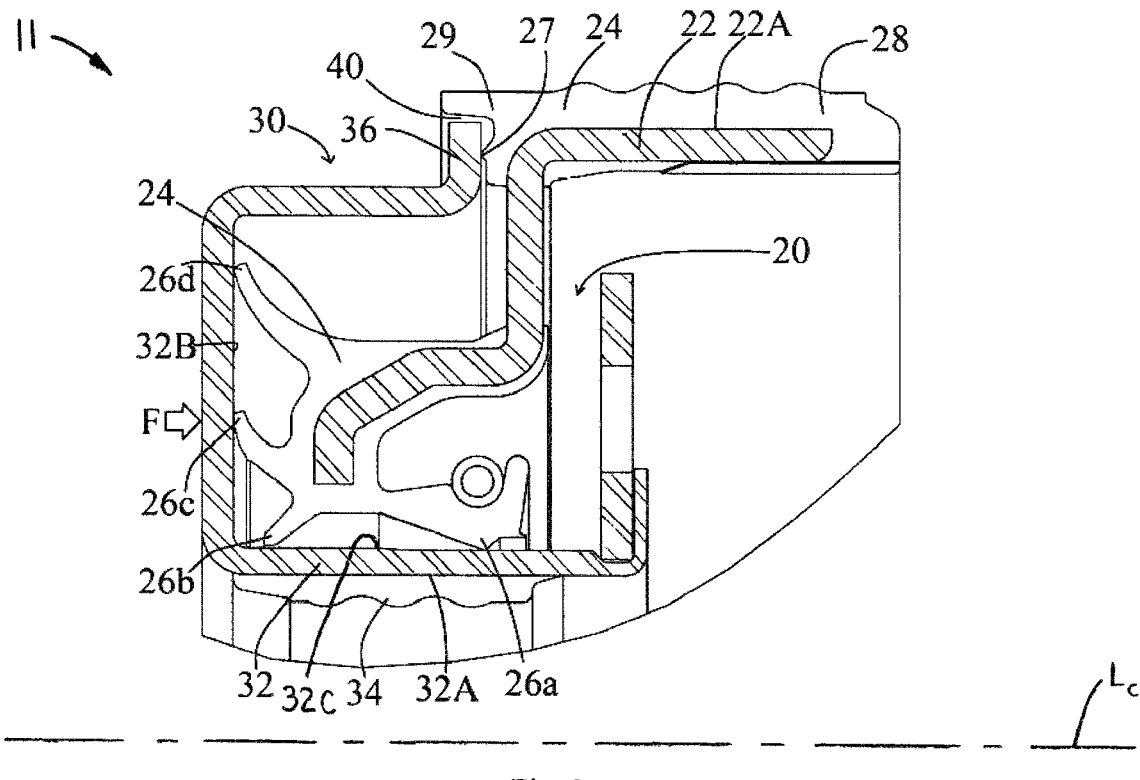
FIG. 3 is a broken-away, axial cross-sectional view of an improved seal assembly according to the present invention.

FIG. 3 shows an axial cross-sectional view of an improved sealing assembly 11 of the present invention. In the illustrated embodiment, the seal assembly 11 is generally annular with a centerline $L_C$ and includes an outer annular seal component 20 and an inner annular seal component 30. In a presently preferred embodiment, the outer seal component 20 is a dynamic seal component frictionally engageable with a rotor 2 and has a dynamic labyrinth portion 29, the inner seal component 30 is a static seal component frictionally engageable with a stator 3 and has a static labyrinth portion 36.

The inner seal component 30 includes an annular stamping or case 32 having generally C-shaped axial cross-sections and a radial flange or "bent portion" 36 formed on the radial periphery of an open, inner side of the case 32 and providing the static labyrinth portion. The inner case 32 also has an outer circumferential surface 32C on the interior of the open side providing a sealing lip contact portion, as discussed below. The outer seal component 20 includes an annular stamping or case 22 and an elastomeric or polymeric annular seal member 24 disposed on the outer case 22 and having a "matching" or mating portion 29 providing the dynamic labyrinth portion and cooperating with the case bent portion 36 to form a labyrinth channel 44. Specifically, the seal member mating portion 29 is formed at a position corresponding to, and spaced both axially apart from and radially outwardly from, the bent portion 36 of the inner case 32, with a contour at least partially aligned with the bent portion 36 so as to "wrap about" or surround the bent portion 36 to form a curved or angled labyrinth channel 40. In other words, the labyrinth channel 40 is formed by the relative positioning of the seal mating portion 29 (i.e., the dynamic labyrinth portion) and the case bent portion 36 (i.e., the static labyrinth portion).

Preferably, the channel 40 extends both radially and axially between the case bent portion 36 and the seal mating portion 29 such that the channel 40 is "turned" or forms about a ninety-degree (90°) bend. That is, the labyrinth channel 40 preferably has a radial section 40a, which is defined between a radial surface 36A of the case bent portion 36 and a radial section 29a of the seal mating portion 29 spaced axially from the bent portion 36, and an axial section 40b defined between an outer axial end surface 36B of the case bent portion 36 and an axial section 29b of the seal mating portion 29 spaced radially outwardly from the bent portion 36, as best shown in FIG. 4.

Figure 4:
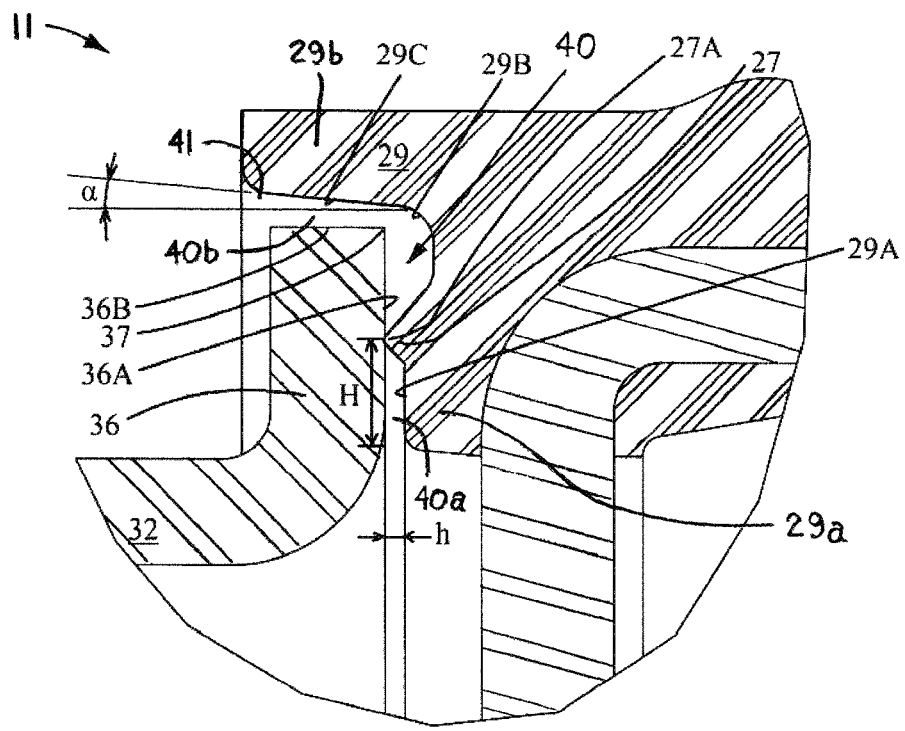
FIG. 4 is an enlarged view of a portion of FIG. 3, showing a labyrinth channel of the present seal assembly.

In the improved sealing assembly 11, a thrust bumper 27 is preferably formed on and extends axially from a partially flat radial surface 29A of the inboard side of the seal mating portion 29, as best shown in FIG. 4, so as to be located within the labyrinth channel 40 after assembly of the seal components 20, 30. Being so located, the thrust bumper 27 defines the axial spacing distance between the outer seal component 20 and the inner seal component 30 by abutting against the bent portion 36 of the inner case 32 during the assembly process. Also, such a location of the thrust bumper 27 enables the bumper 27 to define the gap width of the labyrinth channel 40 as being the axial length or "height" (indicated by "h" in FIG. 4) of the bumper 27. As such, the gap width of the labyrinth channel 40 can be limited by the minimum protrusion height allowed by the seal material molding process and the labyrinth channel 40 constructed thereby is narrower than any labyrinth channel that can be formed by any other known methods. Actual measurement shows that the resulting labyrinth gap (also known as "gap width") can be as low as one tenth of a millimeter (0.1 mm) or even less, which significantly improves the sealing capability of the labyrinth seal gap to the point of being sufficient to meet the non-contact sealing requirements under the most severe working conditions.

FIG. 4 is an enlarged view of a portion of FIG. 3, showing the labyrinth channel 40 in a state in which the thrust bumper 27 is supported on or abutted against a radial surface 36A on the inboard side of the inner case bent portion 36 after assembly of the seal components 20, 30. As depicted in FIG.

4, the thrust bumper 27 may be formed as a continuous annular rib or shoulder, i.e., continuously distributed about a circumference of the seal member 24. Preferably, the thrust bumper 27 extends axially from the radial surface 29A of the seal member 24 and circumferentially about the centerline $L_C$, and has an outer end or tip 27a that forms a line contact (i.e., circular) with the bent portion surface 36A about the circumference. After a period of use of the seal assembly 11, the outer end/tip 27a is flattened or "disappeared" (i.e., worn away or abraded), due to the relative sliding motion between the metallic bent portion 36 of the inner case 32 and the softer, elastomeric/polymeric thrust bumper 27. As a result, the narrowest part or section of the labyrinth channel 40 is formed between the remaining part of the thrust bumper 27 and the radial surface 36A of the inner case bent portion 36.

Figure 2:
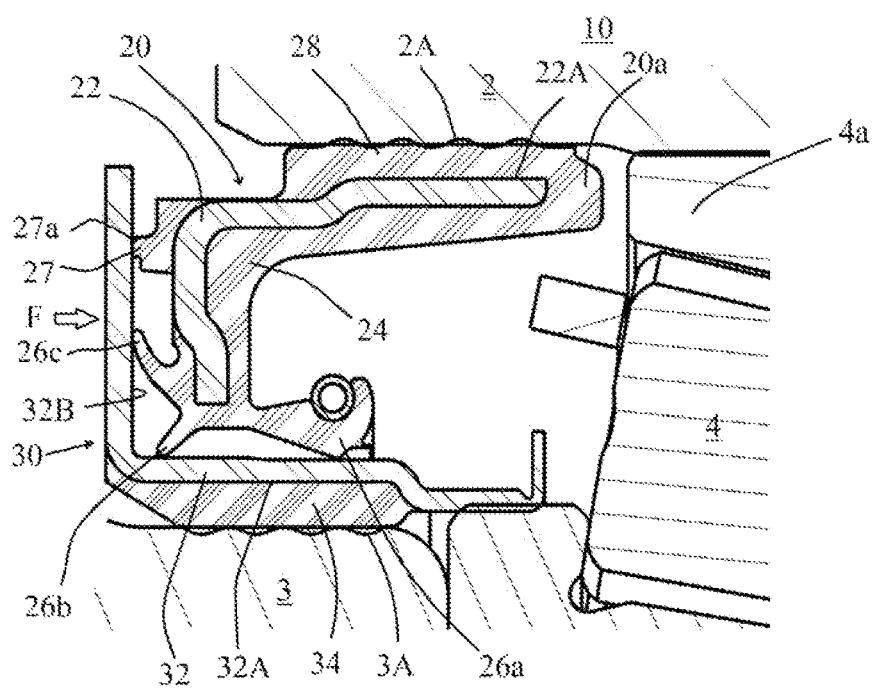
FIG. 2 is a broken-away, enlarged axial cross-sectional view of a prior art seal assembly disposed within the wheel end assembly of FIG. 1.

Compared with the previously known seal shown in FIG. 2, the labyrinth channel 40 of the present seal assembly is a narrow and "turned" channel which extends both radially and axially as discussed above, and is partially defined by an axial flange section 29b of the seal mating portion 29 extending over the opening above the original thrust bumper 27 to prevent foreign matter from directly entering the inside of the seal assembly 11 from the opening. Additionally, the thrust bumper 27 also forms a narrow gap by projecting toward the bent portion surface 36A, to further increase the difficulty of foreign objects passing through the labyrinth channel 40.

Figure 5:
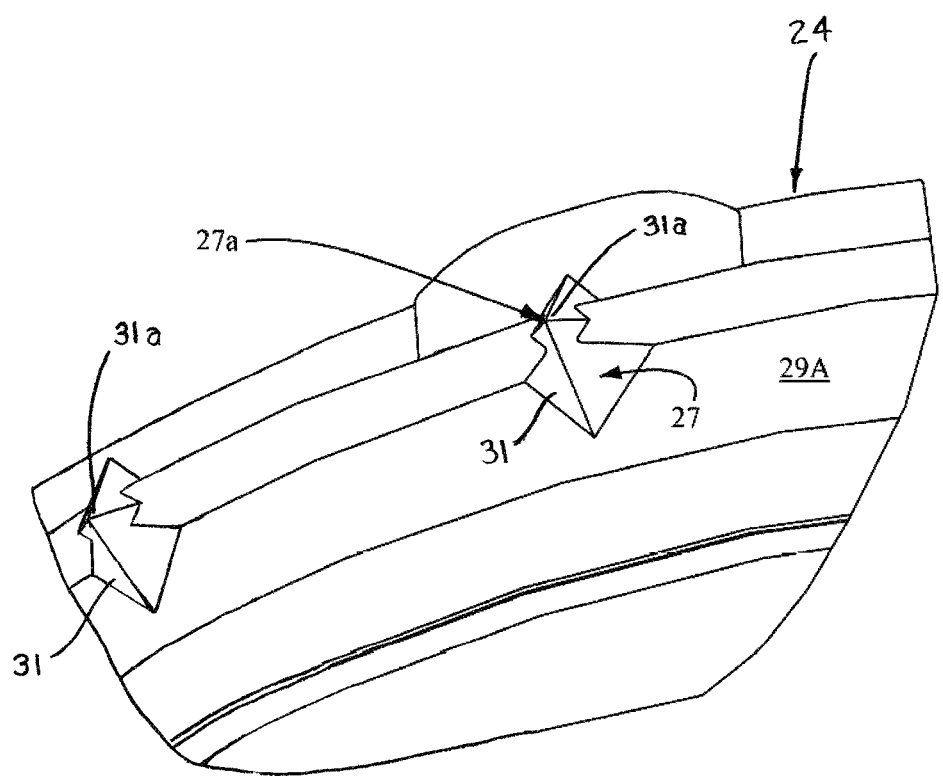
FIG. 5 is an enlarged, perspective view of a protrusion forming a thrust bumper of the present seal assembly.

Alternatively, as shown in FIG. 5, the thrust bumper 27 may be formed of a plurality of protrusions 31 spaced apart about the circumference of the seal member 24 (i.e., spaced circumferentially about the seal assembly centerline $L_C$), with the tip/outer end 31a of each protrusion 31 collectively forming the outer end 27a of the bumper 27 and being in point contact with the bent portion surface 36A of the inner case 32. In this case, the debris generated after each tip 31a is worn or abraded away is far less than the total amount of debris generated after the continuous annular thrust bumper 27 is abraded, so as to greatly reduce the possible threat of debris as a pollutant to the downstream contact seal (see below for details) and the bearing sealed thereby.

Clearly, under the same thrust force F, the pressure borne by the thrust bumper 27 formed as a plurality of protrusions 31 each in point contact with the surface 36A is much greater than the pressure borne by a single, continuous annular thrust bumper 27 in line contact with the surface 36A. Therefore, in the case of the same initial height of the two types of bumpers 27, even considering the elastic recovery of the seal member 24, the amount of compression within the thrust bumper 27 formed as separate protrusions 31 distributed in discrete points that are compressed under the action of the thrust F will be significantly greater than the amount of compression of the thrust bumper 27 formed in a ring shape. As such, the net height (indicated by "h" in FIG. 4) after assembly of a thrust bumper 27 formed of protrusions 31 is significantly less than the net height h of a single, annular or "ring-shaped" thrust bumper 27. Therefore, when the minimum protrusion height allowed by the molding process remains the same, the labyrinth gap defined by the protrusion-formed thrust bumper 27 will also be significantly less than the labyrinth gap defined by the ring-shaped thrust bumper 27.

It should be noted that the labyrinth gap mentioned here does not refer to the narrow clearance (not shown) formed between the worn-out outer end/tip 27a and the bent portion radial surface 36A, but refers to the width h of a section of labyrinth corridor H defined by the height of the thrust bumper 27 after being squeezed during assembly of the seal components 20, 30, as indicated in FIG. 4. Obviously, the narrower labyrinth corridor defined by the net height of the protrusion-formed thrust bumper 27 can further limit the quantity and size of contaminants passing through the labyrinth channel 40.

As a further preferred embodiment, the protrusions 31 of the thrust bumper 27 may be distributed at equal intervals (i.e., angular intervals) about the circumferential direction or centerline $L_C$, the present optimal number of protrusions 31 being between six (6) and twelve (12). The equal height thrust bumpers 27 evenly distributed about the circumference can obviously form a labyrinth corridor with equal gap width in the labyrinth channel 40.

The protrusions 31 of the thrust bumper 27 may be formed such that at least a portion of each protrusion 31 has a conical shape or a pyramidal shape, as shown in FIG. 5. Although such protrusions 31 have a relatively sharp tip 31a that is more likely to be worn off, resulting in "safe debris" with relatively large particles, but such particles are relatively fewer in number. Such particles are called "safe debris" because such debris is more likely to be blocked by the downstream lip-contact seal, as described below, and therefore less likely to pose a threat to a bearing protected by the seal assembly 11. On the other hand, the tapered tip 31a of such protrusions 31 can provide a greater compression ratio so as to define a narrower labyrinth corridor after compression.

As mentioned above, the inner and outer cases 32, 22, respectively, are preferably fabricated as metal stampings. Due to the nature of the stamping process, the stamped cases 32, 22 may occasionally have metal burrs remaining on any sheared edges, for example, protruding beyond the angular edge 37 of the bent portion 36 of the inner case 32. Such metal burrs may damage the mating portion 29 of the elastomeric/polymeric seal member 24 during the operation of the seal assembly 11, thereby causing damage to the formed labyrinth channel 40. To prevent such damage, the mating portion 29 of the seal member 24 may be provided with an annular groove 29B at a position corresponding to (i.e., located adjacent to) the edge 37 to avoid contact of possible metal burrs on the inner case 32 with the seal member 24. Although the groove 29B may cause the local broadening in the labyrinth channel 40, it will not significantly affect the overall sealing capability of the seal assembly 11.

As shown in FIG. 4, the labyrinth channel 40 preferably has substantially L-shaped axial cross sections, with a "right-angle" bend formed at a position corresponding to the inner case annular edge 37 and with the channel 40 opened toward the inboard side. Specifically, the labyrinth channel 40 has a radially-extending section 40a and an axially-extending section 40b, with the axially-extending section 40b preventing contaminants from directly entering the remainder of the labyrinth channel 40 under the action of gravity. Thus, the L-shaped bend further increases the difficulty of contaminants passing through the labyrinth channel 40.

To further improve the sealing efficiency or protective effect, the mating portion 29 of the seal member 24 has an inner circumferential surface 29C at the opening 41 of the labyrinth channel 40 which preferably defines an angle α with respect to the axial direction, and thus with respect to the seal assembly centerline $L_C$. When the outer seal component 20 rotates with the hub 2, the angle α of the inner surface 29C is favorable for centrifugal force to direct contaminants, such as mud, outwardly from the channel 40 through the channel opening 41. Preferably, the inclination angle α is between five degrees (5°) and fifteen degrees (15°).

On the path of foreign matter intruding into the hub 2, the labyrinth channel 40 is located upstream of the sealing lips 26. To further improve the contact sealing effect, the present seal assembly 11 also increases the number of sealing lips 26 from three to four. The improved sealing lips 26 include two radial sealing lips 26a, 26b and two axial sealing lips 26c, 26d, with the axial sealing lips 26c, 26d both arranged to extend obliquely outward in the radial direction and elastically lean on or engage against the "smooth" radial inner surface 32B on the open side of the inner case 32. Compared with the existing axial sealing lip 26c (such as shown in FIG. 2), the additional, radially outer axial sealing lip 26d has an elongated length significantly greater than an elongated length of the radially inner axial sealing lip 26c, which substantially reduces the contact stress of the lip 26d against the inner case 32. In addition, since a lubricant is preferably injected between the sealing lips 26a-26d to reduce contact friction, the friction increase caused by the additional sealing lip 26d is completely within an acceptable range, but the resulting improvement in the sealing effect is quite significant.

A primary factor in seal design is to obtain the highest possible sealing performance with the lowest possible frictional resistance. On the one hand, the present invention provides a narrow labyrinth channel 40 through the thrust bumper 27, thereby improving the protective performance of the non-contact portion of the seal. On the other hand, the present invention further improves the sealing effect of the contact portion of the seal by a limited increase in the number of sealing lips. Through the combination of the above two design aspects, the overall protection performance of the seal assembly 11 is significantly improved at the cost of limited increase in friction.

It can be seen from the above description that the design concept of the present invention is fully applicable to rotating equipment in a broader sense; that is, to any rotating machine that includes a dynamic rotor and a static stator, and is not limited to the vehicle hub assembly described above. It is apparent that in the present seal assembly 11, as long as the dynamic seal component is assembled on the rotor and the static seal component on the stator, a narrow labyrinth channel can be constructed through the thrust bumper 27 to improve the sealing efficiency or effect.

Representative, non-limiting examples of the present invention were described above in detail with reference to the attached drawings. This detailed description is merely intended to teach a person of skill in the art further details for practicing preferred aspects of the present teachings and is not intended to limit the scope of the invention.

Moreover, combinations of features and steps disclosed in the above detailed description may not be necessary to practice the invention in the broadest sense, and are instead taught merely to particularly describe representative examples of the invention. Furthermore, various features of the above-described representative examples, as well as the various independent and dependent claims below, may be combined in ways that are not specifically and explicitly enumerated in order to provide additional useful embodiments of the present teachings.

All features disclosed in the description and/or the claims are intended to be disclosed separately and independently from each other for the purpose of original written disclosure, as well as for the purpose of restricting the claimed subject matter, independent of the compositions of the features in the embodiments and/or the claims. In addition, all value ranges or indications of groups of entities are intended to disclose every possible intermediate value or intermediate entity for the purpose of original written disclosure, as well as for the purpose of restricting the claimed subject matter. The invention is not restricted to the above-described embodiments, and may be varied within the scope of the following claims.

We claim:

1. A seal assembly for sealing the annular space between a rotor and a stator of a rotating device, the seal assembly comprising:
    a static inner seal component frictionally engageable with the stator and including an annular case with an inner axial flange, a radial flange extending radially outwardly from the inner axial flange, an outer axial flange extending axially from the outer end of the radial flange so as to be spaced radially outwardly from and overlapping the inner axial flange, and a bent portion extending radially outwardly from the outer axial flange and having a radial surface; and
    a dynamic outer seal component frictionally engageable with the rotor and including an annular case and an elastomeric seal member disposed on the case, the seal member having at least one radial sealing lip engaged with the inner axial flange of the inner seal component case, at least two axial sealing lips engaged with the radial flange of the inner seal component case, a labyrinth portion disposed adjacent to and spaced axially and radially from the bent portion of the inner seal component case so as to define a labyrinth channel having an angled outer radial section and an axial section, and a thrust bumper integrally formed with and extending axially from the labyrinth portion, the radial surface of the bent portion of the inner seal component case being engaged solely by the thrust bumper such that a gap width of an inner portion of the axial section of the labyrinth channel is entirely defined by the height of the thrust bumper, a gap width of an outer portion of the axial section being larger than the inner portion, during assembly of the inner seal component and the outer seal component, the thrust bumper being configured to be at least partially abraded during use of the rotating device.

2. The seal assembly according to claim 1, wherein the thrust bumper is formed as a plurality of protrusions spaced circumferentially apart about a centerline of the seal assembly.

3. The seal assembly according to claim 2, wherein the plurality of protrusions are equally spaced about the centerline of the seal assembly.

4. The seal assembly according to claim 2, wherein the plurality of protrusions includes between six protrusions and twelve protrusions.

5. The seal assembly according to claim 2, wherein at least a portion of each protrusion has a conical shape or a pyramidal shape.

6. The seal assembly according to claim 1, wherein the case of the inner seal component is formed as a metal stamping and the dynamic labyrinth portion is formed with a groove located adjacent to a sheared edge of the case bent portion so as to provide clearance from any burrs on the metal stamping.

7. The seal assembly according to claim 1, wherein the labyrinth channel is formed with at least one turn partially defined by an inner circumferential surface of the seal labyrinth portion and has an axial opening facing the inboard side of the seal assembly.

8. The seal assembly according to claim 7, wherein the inner circumferential surface of the seal labyrinth portion has an outward inclination angle with a value of between five degrees and fifteen degrees.

9. The seal assembly according to claim 1, wherein the thrust bumper is formed as a continuous annular shoulder.

10. The seal assembly according to claim 1, wherein the at least one radial sealing lip includes two radial sealing lips engageable with an outer circumferential surface of the inner axial flange of the case of the inner seal component.

11. The seal assembly according to claim 1, wherein the labyrinth portion of the seal member has a radial section spaced axially from the bent portion of the inner seal component case so as to define the radial section of the labyrinth channel and an axial section spaced radially outwardly from the bent portion the inner seal component case so as to define the axial section of the labyrinth channel.

12. The seal assembly according to claim 1, wherein the gap width is no greater than one tenth of a millimeter (0.1 mm).

* * * * *